United States Patent
Theil et al.

(10) Patent No.: US 11,015,079 B2
(45) Date of Patent: May 25, 2021

(54) CONDENSATION REACTION AND/OR ADDITION REACTION CURABLE COATING COMPOSITION

(71) Applicant: BASF COATINGS GMBH, Muenster (DE)

(72) Inventors: Hubert Theil, Shanghai (CN); Silke Przybilla, Muenster (DE); Dagmar Schemschat, Senden (DE); Hildegund Diekmann, Drensteinfurt (DE); Martin Geuting, Muenster (DE); Ignacia Rump, Muenster (DE); Dirk Benning, Muenster (DE)

(73) Assignee: BASF Coatings GmbH, Muenster (DE)

( * ) Notice: Subject to any disclaimer, the term of this patent is extended or adjusted under 35 U.S.C. 154(b) by 89 days.

(21) Appl. No.: 16/335,352

(22) PCT Filed: Sep. 13, 2017

(86) PCT No.: PCT/EP2017/072949
§ 371 (c)(1),
(2) Date: Mar. 21, 2019

(87) PCT Pub. No.: WO2018/054725
PCT Pub. Date: Mar. 29, 2018

(65) Prior Publication Data
US 2019/0276699 A1 Sep. 12, 2019
US 2020/0299537 A9 Sep. 24, 2020

(30) Foreign Application Priority Data
Sep. 22, 2016 (EP) .................................... 16190143

(51) Int. Cl.
*C09D 163/00* (2006.01)
*B01J 31/22* (2006.01)
*B01J 23/00* (2006.01)
*C09D 175/04* (2006.01)

(52) U.S. Cl.
CPC ............ *C09D 163/00* (2013.01); *B01J 23/00* (2013.01); *B01J 31/2217* (2013.01); *C09D 175/04* (2013.01); *B01J 2231/005* (2013.01); *B01J 2531/004* (2013.01)

(58) Field of Classification Search
CPC .............................................. C09D 175/04–16
See application file for complete search history.

(56) References Cited

U.S. PATENT DOCUMENTS

| | | | | |
|---|---|---|---|---|
| 4,551,518 A * | 11/1985 | Matsumoto | ........ | C08G 18/4275 528/65 |
| 4,861,904 A | 8/1989 | Sugie | | |
| 6,590,057 B1 * | 7/2003 | Brecht | ................. | C08G 18/163 36/25 R |
| 6,747,102 B1 | 6/2004 | Christie et al. | | |
| 2002/0120035 A1 * | 8/2002 | Sawada | ..................... | C08F 8/32 523/410 |
| 2006/0293486 A1 * | 12/2006 | Emmrich | ................ | C08G 18/10 528/44 |
| 2009/0275771 A1 * | 11/2009 | Jacob | ..................... | C07C 269/04 560/24 |
| 2010/0120996 A1 * | 5/2010 | Tokunaga | .......... | C08G 65/2654 525/528 |
| 2016/0264815 A1 | 9/2016 | Joege et al. | | |

OTHER PUBLICATIONS

Da Silva, et al., "Molecular thermochemical study of Ni(II), Cu(II) and Zn(II) complexes with N,N'-bis(salicylaldehydo) ethylenediamine", Journal of Molecular Catalysis A: Chemical, vol. 224, Issue 1-2, Dec. 15, 2004, pp. 207-212.
European Search Report for EP Patent Application No. 16190143.4, dated Feb. 27, 2017, 3 pages.
International Search Report for International Application No. PCT/EP2017/072949, dated Sep. 29, 2017, 2 pages.

* cited by examiner

*Primary Examiner* — Michael M Dollinger
(74) *Attorney, Agent, or Firm* — Armstrong Teasdale LLP

(57) ABSTRACT

Provided herein is a coating composition curable by condensation and/or addition reactions and including (A) at least one polymer as binder, (B) at least one crosslinking agent that can be reacted by condensation and/or addition reaction with component (A), and (C) at least one specific complex as catalyst. Also provided herein is a use of the complex for catalyzing the curing of coating compositions curable by condensation and/or addition reaction.

14 Claims, No Drawings

CONDENSATION REACTION AND/OR ADDITION REACTION CURABLE COATING COMPOSITION

CROSS-REFERENCE TO RELATED APPLICATIONS

This application is the national stage entry of PCT/EP2017/072949, filed on Sep. 13, 2017, which claims the benefit of priority to European Patent Application No. 16190143.4, filed Sep. 22, 2016, which are incorporated by reference in their entirety herein.

The present invention relates to a coating composition curable by condensation and/or addition reaction and comprising at least one polymer as binder, at least one crosslinking agent which can be reacted by condensation and/or addition reaction with component (A), and (C) at least one specific catalyst. The present invention also relates to the use of the specific catalyst for catalyzing the curing of coating compositions curable by condensation and/or addition reaction.

BACKGROUND

Coating compositions curable by condensation and/or addition reaction and comprising polymers as binders and also crosslinking agents are known. For the curing of these compositions, after application to a coating substrate, for example, various different catalysts are used. Serving generally for this purpose are carboxylic salts of metal ions, or organometallic compounds such as dibutyltin dilaurate.

The availability of new and/or alternative catalysts is limited and is often served only by simple variants of the classes of compound already identified. The compounds are often given a higher excess of acids in order to enable a liquid supply form, for example. In some cases these acids are objectionable for environmental and/or health reasons (ethylhexanoic acid, for example). Frequently the stated organometallic compounds also have (reproductive) toxicity. There are also limitations on the fields of use of the catalysts, on account of the partially restricted solubilities and/or compatibilities in the respective coating compositions. For instance, bismuth carboxylates, which are known per se, can be used only to a very limited extent in aqueous systems, since the solubility of bismuth oxides and hydroxides in water is very low.

Overall, therefore, there is a need for alternative catalysts for the curing of coating compositions curable by condensation and/or addition reaction, in order thereby to improve application options and individual adaptations of different coating systems.

U.S. Pat. No. 4,861,904 describes ultrathin organometallic films which comprise a metal complex compound which is based on a Schiff base, leading to a high oxygen absorption rate and desorption rate.

SUMMARY

A problem addressed by the present invention was to find new coating compositions, curable by condensation and/or addition reaction, which comprise catalysts that are an alternative in comparison to catalytic systems already known.

What has been found is a coating composition curable by condensation and/or addition reactions and comprising
(A) at least one polymer as binder,
(B) at least one crosslinking agent which can be reacted by condensation and/or addition reaction with component (A), and
(C) at least one complex of the formula (I) as catalyst

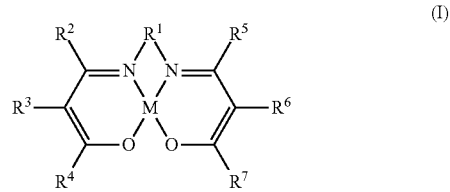

where
M is a di-, tri- or tetravalent metal cation,
$R^1$ is a divalent aliphatic, aromatic or araliphatic hydrocarbon radical having 1 to 10 carbon atoms,
$R^2$ and $R^5$, independently of one another, are each hydrogen or a monovalent aliphatic, aromatic or araliphatic organic radical having 1 to 10 carbon atoms, and
(i) $R^3$, $R^4$, $R^6$, and $R^7$, independently of one another, are each hydrogen or a monovalent aliphatic, aromatic or araliphatic organic radical having 1 to 20 carbon atoms or
(ii) $R^3$ and $R^6$, independently of one another, are each a divalent aliphatic, aromatic or araliphatic organic radical having 1 to 20 carbon atoms, $R^4$ and $R^7$ are a covalent bond, and $R^3$ and $R^6$ are linked via these covalent bonds to the carbon atoms in alpha-position to the oxygen atom of the formula (I), or
(iii) the radicals $R^3$ and $R^4$ meet the definition under (i) and the radicals $R^6$ and $R^7$ meet the definition under (ii).

The new coating compositions are also called coating compositions of the invention and are subjects of the present invention. Preferred embodiments are apparent from the description below and from the dependent claims.

Another subject of the present invention is the use of the catalyst (C) for catalyzing the curing of coating compositions curable by condensation and/or addition reaction, as also are coatings produced by applying the compositions to substrates and subsequently curing.

The coating compositions of the invention can be cured in a way which is an alternative by comparison with the prior art but which nevertheless meets the requirements.

DETAILED DESCRIPTION

The coating composition of the invention comprises at least one polymer (A) as binder and also a crosslinking agent (B) which can be reacted by condensation and/or addition reaction with component (A).

Polymers (A) as binders are, for example, suitably randomly, alternatingly and/or blockwisely constructed linear and/or branched and/or combwisely constructed (co)polymers of ethylenically unsaturated monomers, or polyaddition resins and/or polycondensation resins. Regarding these terms, reference is made for further details to Römpp Lexikon Lacke and Druckfarben, Georg Thieme Verlag, Stuttgart, N.Y., 1998, page 457, "Polyaddition" and "Polyaddition resins (polyadducts)", and also pages 463 and 464, "Polycondensates", "Polycondensation", and "Polycondensation resins", and also pages 73 and 74, "Binders".

Examples of suitable (co)polymers are (meth)acrylate (co)polymers or partially hydrolyzed polyvinyl esters, especially (meth)acrylate copolymers. Examples of suitable polyaddition resins and/or polycondensation resins are polyesters, alkyds, polyurethanes, polylactones, polycarbonates, polyethers, epoxy resins, epoxy resin-amine adducts, polyureas, polyamides, polyimides, polyester-polyurethanes, polyether-polyurethanes or polyester-polyether-polyurethanes.

The polymers (A) as binders comprise for example thio, hydroxyl, amino, N-methylolamino-N-alkoxymethylamino, imino, carbamate, allophanate and/or carboxyl groups, preferably hydroxyl, primary and secondary amino and/or carboxyl groups, more particularly hydroxyl groups. Via these functional groups it is then possible, via condensation and/or addition reaction, for crosslinking to take place with crosslinking agents (B) described later on below, which comprise further functional groups such as, for example, anhydride, carboxyl, epoxy, free or blocked isocyanate, urethane, methylol, methylol ether, siloxane, carbonate, amino, hydroxyl and/or beta-hydroxyalkylamide groups. In this way, then, the two components are therefore reacted via condensation and/or addition reactions.

With particular preference the coating composition comprises as binder a polymer (A) which comprises hydroxyl groups and/or primary and/or secondary amino groups. It is therefore the case that the coating composition comprises at any rate, though not necessarily exclusively, a polymer of this kind as binder.

The coating composition of the invention comprises at least one crosslinking agent (B). Crosslinking agents and their use in coating compositions are known to the skilled person. They are in principle components having reactive functional groups which are complementary to the reactive functional groups of, for example, polymers used as binders, more particularly the polymers (A), and are able accordingly to crosslink chemically.

The terms "binder" and "crosslinking agent" are used in the context of the present invention for greater clarity or for greater ease of differentiation. The two terms are known to the skilled person and accordingly have a clarifying character. In principle, in the case of the externally crosslinking thermal curing of a coating composition, crosslinking takes place between the functional groups of a binder polymer and the consequently complementary functional groups of the crosslinking agent. Typical combinations of polymers as binders and crosslinking agents are, for example, hydroxy- and/or carboxy-functional polymers as binders, and free or blocked polyisocyanates and/or aminoplast resins, more particularly melamine resins and benzoguanamine resins, in other words adducts containing methylol and/or methylol ether groups, or polycarbodiimides as crosslinking agents.

Preferred for use in the context of the present invention are crosslinking agents selected from the group consisting of free or blocked polyisocyanates, aminoplast resins, more particularly melamine resins and benzoguanamine resins, and also polycarbodiimides. Especially preferred are free or blocked polyisocyanates, more particularly blocked polyisocyanates.

The above therefore means that the coating composition of the invention is curable thermally—in other words, crosslinking (formation of a coating film) may take place by chemical reaction of reactive functional groups as described above, the energetic activation of this chemical reaction being possible through thermal energy and under the catalytic effect of catalysts, such as the catalyst (C) described hereinafter.

Other curing mechanisms, as for example a proportional physical curing (that is, the curing of a layer of a coating composition by filming through loss of solvent from the coating composition, with the linking taking place within the coating via looping of the polymer molecules), are of course not ruled out. Physical curing in particular will always take place proportionally.

The amount of polymers (A) as binders is, for example, 5 to 50 wt %, based on the total amount of the coating composition of the invention.

Determining the fraction of the polymers (A) or of a particular polymer (A) is carried out as follows: The solids content of a binder dispersion of a polymer (A) which is to be added to the coating composition is ascertained. Taking account of the solids content of the binder dispersion and of the amount of the dispersion used in the coating composition, it is then possible to determine and/or specify the fraction of the polymer (A) within the composition as a whole. This method is employed in this context fundamentally for a variety of different components to be used.

The solids content for the purposes of the present invention, unless otherwise specified, is determined in accordance with DIN EN ISO 3251 with an initial mass of 1.0 g of sample, such as 1.0 g of the coating material of the invention, for example, with a test duration of 60 minutes at a temperature of 125° C.

The amount of crosslinking agents (B) is, for example, 0.5 to 30 wt %, based in each case on the total amount of the coating composition of the invention.

The coating composition used in accordance with the invention comprises at least one specific complex as catalyst (C).

The catalyst has a structure according to formula (I) below

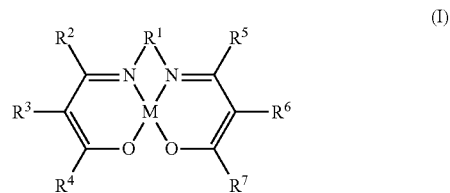

where

M is a di-, tri- or tetravalent metal cation, $R^1$ is a divalent aliphatic, aromatic or araliphatic hydrocarbon radical having 1 to 10 carbon atoms, $R^2$ and $R^5$, independently of one another, are each hydrogen or a monovalent aliphatic, aromatic or araliphatic organic radical having 1 to 10 carbon atoms, and (i) $R^3$, $R^4$, $R^6$, and $R^7$, independently of one another, are each hydrogen or a monovalent aliphatic, aromatic or araliphatic organic radical having 1 to 20 carbon atoms or (ii) $R^3$ and $R^6$, independently of one another, are each a divalent aliphatic, aromatic or araliphatic organic radical having 1 to 20 carbon atoms, $R^4$ and $R^7$ are a covalent bond, and $R^3$ and $R^6$ are linked via these covalent bonds to the carbon atoms in alpha-position to the oxygen atom of the formula (I), or (iii) the radicals $R^3$ and $R^4$ meet the definition under (i) and the radicals $R^6$ and $R^7$ meet the definition under (ii).

The catalyst is a complex. Accordingly, the bonds shown in formula (I) between metal cation and electron donor (oxygen, nitrogen) are not conventional covalent bonds, but are in fact complex bonds between metal cation and ligand.

Suitability as metal cation M is therefore possessed by divalent, trivalent or tetravalent metal cations. Consideration may be given in principle to all main-group and transition-group metal cations that are available in this respect, preferably 3d metal cations. Examples are V(III), V(IV), Cr(III), Mn(III), Fe(II), Fe(III), Co(II), Co(III), Ni(II), Cu(II), Bi(III) and Zn(II). If the metal cation is not divalent, the structure according to formula (I) carries one or two positive charge(s). This at least one charge must then be simply compensated by means, for example, of inorganic anions such as chloride, nitrate, tetraphenylborate or hydroxide, for example.

Ahead of the more precise description of the radicals $R^1$ to $R^7$, a number of terms will first be elucidated.

An aliphatic compound is a saturated or unsaturated organic compound (that is, a compound containing carbon and hydrogen) which is not aromatic and not araliphatic. An aliphatic compound may for example consist exclusively of carbon and hydrogen (aliphatic hydrocarbon) or as well as carbon and hydrogen may also contain heteroatoms in the form of bridging or terminal functional groups and/or molecular moieties, identified later on below. Furthermore, therefore, the term "aliphatic compound" embraces both cyclic and acyclic aliphatic compounds, and is understood as a corresponding generic term in the context of the present invention as well.

Acyclic aliphatic compounds may be straight-chain (linear) or branched. Linear in this context means that the compound in question has no branches in relation to the carbon chain, the carbon atoms instead being arranged exclusively in linear sequence in one chain. Branched or nonlinear for the purposes of the present invention therefore means that the respective compound exhibits branching in the carbon chain; in other words, then, in contrast to the linear compounds, at least one carbon atom in the compound in question is a tertiary or quaternary carbon atom. Cyclic aliphatic compounds or cyclic-aliphatic compounds are those compounds in which at least some of the carbon atoms present in the molecule are linked in such a way as to form one or more rings. Of course, in addition to the one or more rings, there may be further acyclic straight-chain or branched aliphatic groups and/or molecular moieties present in a cyclic-aliphatic compound.

Functional groups or molecular moieties for the purposes of the present invention are designations for groups which include or consist of heteroatoms such as oxygen and/or sulfur, for example. The functional groups may be bridging, in other words may represent, for example, an ether, ester, keto or sulfonyl group, or may be terminal, as in the case of hydroxyl groups, sulfone groups or carboxyl groups, for example. It is also possible for bridging and terminal functional groups to be present at the same time in an aliphatic compound.

An aliphatic radical, accordingly, is a radial which meets the conditions stated above for the aliphatic compounds, but is only part of a molecule.

An aromatic compound, as is known, is a cyclic, planar organic compound having at least one aromatic system, therefore containing at least one ring system with a fully conjugated Π-system in accordance with the aromaticity criteria of Hückel. It may for example be a pure hydrocarbon compound (benzene, for example). It is also possible for certain heteroatoms to be incorporated in the ring structure (pyridine is an example). As well as the one or more aromatic ring systems, an aromatic compound may also contain further straight-chain and/or branched hydrocarbon groups and also bridging and/or terminal functional groups as part of the aromatic compound, provided they form a part of the conjugated Π-system. For example, two phenyl rings linked by a keto group or an ether group are likewise aromatic compounds.

For the purposes of the invention, accordingly, an aromatic radical is a radical which meets the stipulations given above for the aromatic compounds, but is only part of a molecule.

An araliphatic compound is an organic compound which comprises aromatic and aliphatic molecular moieties. A mixed aromatic-aliphatic compound of this kind must accordingly contain both an aromatic group and an aliphatic group.

An araliphatic group, accordingly, for the purposes of the invention is a group which meets the stipulations given above for the araliphatic compounds, but is only part of a molecule.

A monovalent radical is a radical which is obviously linked via one covalent bond to the rest of the molecule. A divalent radical, accordingly, is a radical which is linked via two covalent bonds to the rest of the molecule.

The statements in the definition (ii) of the radicals $R^3$ and $R^6$ and also $R^4$ and $R^7$, especially that the radicals $R^4$ and $R^7$ represent a covalent bond, are therefore also understood without problems. The radicals $R^4$ and $R^7$ in this case would replace the covalent bonds between $R^4$ and $R^7$ and the carbon atoms situated in alpha-position to the oxygen atoms, these bonds being drawn in formula (I), resulting ultimately in a ring structure. For example, the radical $R^6$ may have a configuration such as to result in a phenyl ring, which of course may also have further substitution. In this case, which is preferred, the C—C double bond indicated in formula (I) is then of course part of the conjugated Π-system. The drawing of the C—C double bond in formula (I), however, is in any case only one possible limiting structure. As the skilled person is aware, mesomeric limiting structures are realizable in principle in the structure according to formula (I).

The radical $R^1$ in a first preferred embodiment is an acyclic, aliphatic hydrocarbon radical having 1 to 10, preferably 2 to 10, more preferably 2 to 6, very preferably 2 to 4, carbon atoms.

In another preferred embodiment the radical $R^1$ is an aromatic hydrocarbon radical having 6 to 10, more preferably 6, carbon atoms.

The radicals $R^2$ and $R^5$ are preferably hydrogen or a monovalent aliphatic hydrocarbon radical having 1 to 10 carbon atoms, more preferably hydrogen or a monovalent aliphatic hydrocarbon radical having 1 to 2 carbon atoms, very preferably hydrogen.

The radicals $R^3$, $R^4$, $R^6$ and $R^7$ according to variant (i) are preferably hydrogen or a monovalent aliphatic hydrocarbon radical having 1 to 10 carbon atoms, more preferably hydrogen or a monovalent aliphatic hydrocarbon radical having 1 to 2 carbon atoms. Very preferably $R^3$ and $R^6$ are hydrogen and $R^4$ and $R^7$ are methyl radicals.

For the radicals $R^3$, $R^4$, $R^6$, and $R^7$, the variant (ii) as defined above is preferred. In that case it is preferred for the radicals $R^3$ and $R^6$ to be configured in such a way as to produce a benzene ring, which of course may also have further substitution, in which case the C—C double bonds drawn in formula (I) are part of the conjugated Π-system.

Preferably none of the radicals $R^1$ to $R^7$ contains heteroatoms, instead containing only hydrogen and optionally carbon.

In especially preferred complexes, the ligand is based on bis(salicylidene)ethylenediamine. This means that the catalyst is a complex of doubly deprotonated bis(salicylidene) ethylenediamine with a metal cation.

The amount of catalysts (C) is preferably 0.01 to 3.00 wt %, based in each case on the total amount of the coating composition of the invention.

Depending on the desired application, the coating composition used in accordance with the invention may comprise one or more customarily employed pigments, fillers and also solvents such as water or organic solvents. It is also possible for additives, different from the above-described components (A) to (C), to be present, as component (D). These additives (D) are preferably selected from the group consisting of waxes, antioxidants, antistats, wetting and dispersing agents, emulsifiers, flow control assistants, solubilizers, defoamers, wetting agents, stabilizers, preferably heat stabilizers, process stabilizers and UV and/or light stabilizers, photoprotectants, deaerating agents, inhibitors, catalysts, flexibilizers, flame retardants, organic solvents such as butyl glycol and/or butyl glycol acetate, for example, reactive diluents, hydrophobizers, hydrophilizers, thickeners, thixotropic agents, impact modifiers, expandants, process auxiliaries, plasticizers, fibrous solids, and mixtures of the aforementioned additives. The additive content of additive (G) in the coating composition of the invention may vary very widely according to the intended use.

The coating composition of the invention preferably has a solids content of 10 to 85 wt %.

By solids content (nonvolatile fraction) is meant that weight fraction which remains as a residue on evaporation under specified conditions. In the present patent application, unless explicitly indicated otherwise, the solids content is determined according to DIN EN ISO 3251 (60 minutes, 130° C.)

The coating composition of the invention can be produced by subjecting the respective components of the coating composition as have been described above to mixing and dispersing and/or dissolving by means of high-speed stirrers, stirred tanks, agitator mills, dissolvers, kneading apparatus or inline dissolvers.

The present invention also relates to the use of the specific catalyst for catalyzing the curing of coating compositions curable by condensation and/or addition reaction.

The present invention further relates to a coating produced by applying and curing the coating composition of the invention on a substrate. The present invention relates equally to a method for producing this coating by applying the coating composition to a substrate and subsequently curing thermally.

Substrates contemplated ultimately are all substrates known to the skilled person in this context, such as metallic substrates or plastics substrates. These substrates may have any desired shape.

The coating composition of the invention is applied in the manner familiar to the skilled person, and its application may be carried out, for example, by rolling, dipping, knife-coating, spraying, as for example by compressed-air spraying, airless spraying, high-speed rotation, electrostatic spray application (ESTA), optionally in conjunction with hot spray application such as hot air spraying, for example. Rolling techniques are preferred.

Following application, the applied coating composition is subjected to thermal curing. Curing, more specifically complete curing, has the semantic content familiar to the skilled person. Accordingly, curing, more specifically complete curing, of a coating film refers to the conversion of such a film into the service-ready condition, in other words into a condition in which the substrate furnished with the coating film in question can be transported, stored, and used in its intended fashion. A cured coating film is therefore in particular no longer soft or tacky, but instead in the condition of a hard coating film. Its properties such as hardness, substrate adhesion or abrasion resistance are no longer improved even on further exposure to curing conditions as described later on below. In this state, therefore, it is no longer possible to increase the crosslinking structure of the coating film by further exposure to curing conditions as described below; any reactive complementary functional groups still present in the components, such as polymers as binders and crosslinking agents, are no longer mobile, owing to the solidity of the coating, and, accordingly, are no longer available for further curing reaction. On the contrary, indeed, further exposure to curing conditions as described later on below may even result in breakdown of the network, thus in fact impairing again the inherently advantageous qualities of the coasting.

Complete thermal curing may take place preferably at a temperature between 40 and 220° C. for a time from 5 to 180 minutes.

It is, however, likewise possible, according to components (A) and (B) used, to carry out the complete thermal curing at room temperature (15 to 25° C.) for a time from 1 to 72 hours.

The stated temperatures are understood in each case as oven temperatures, in other words as the ambient temperature of the compartment in which the coated substrate is cured.

The coatings produced by using the coating composition of the invention have a dry film thickness of 5 to 500 micrometers, for example.

EXAMPLES

Sol-gel experiments were carried out for determining the catalytic activity of the catalysts for inventive use. The ligand former used was bis(salicylidene)ethylenediamine (salen), and was admixed with different trivalent and divalent metal cations (in this regard, see J. Molecular Catalysis A: Chemical, 2004, 224, 207-212).

Employed as comparative systems were known crosslinking catalysts (dibutyltin dilaurate (DBTL) and bismuth(III) (2-ethylhexanoate) (Bi carboxylate)) and also a system without catalyst.

Employed as component (A) and component (B) of coating compositions, respectively, was a commercial hydroxyl-functional polymer (bisphenol A-based polyetheramine) and a commercial blocked polyisocyanate (alcohol-blocked, oligomeric methylenediphenyl isocyanate).

The two components (A) and (B) were mixed with one another (25:15 by weight), dissolved in a suitable solvent such as isopropanol or tetrahydrofuran with an amount of 6 mmol of the respective catalyst per 100 g of nonvolatile fraction of components (A) and (B), and then exposed as a mixture to a temperature of 180° C. for a time of 20 minutes.

Thereafter the gel fraction (the crosslinked fraction) was ascertained. The above reaction mixture was placed in THF for 24 hours, and then filtered, and the filter residue was dried at 75° C. for 4 hours and weighed. The greater the gel fraction, the greater, evidently, the fraction of components (A) and (B) crosslinked with one another. A high gel fraction can therefore evidently be equated with a high catalytic activity on the part of the catalyst used.

Table 1 shows the results.

TABLE 1

| Catalyst | DBTL | Bi carboxylate | — | Salen |
|---|---|---|---|---|
| Gel fraction | 91 | 90 | 0 | 0 |
| Catalyst | [Mn(salen)](OAc) | [Fe(salen)]NO$^3$) | [Bi(salen)NO$^3$)– | [Zn(salen)] |
| Gel fraction | 85 | 69 | 70 | 78 |

The results show that the catalysts for inventive use represent appropriate alternatives to known catalytic systems.

What is claimed is:

1. A coating composition curable by condensation and/or addition reactions, the coating composition comprising:
   (A) at least one polymer as binder,
   (B) at least one crosslinking agent that can be reacted by condensation and/or addition reaction with component (A), and
   (C) at least one complex of the formula (I) as catalyst,

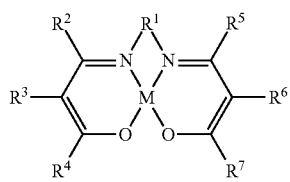

(I)

where
M is a di-, tri-, or tetravalent metal cation comprising V(III), V(IV), Cr(III), Mn(III), Fe(II), Fe(III), Co(II), Co(III), Ni(II), Cu(II), Bi(III) and/or Zn(II),
$R^1$ is a divalent aliphatic, aromatic, or araliphatic hydrocarbon radical having 1 to 10 carbon atoms,
$R^2$ and $R^5$, independently of one another, are each hydrogen or a monovalent aliphatic, aromatic, or araliphatic organic radical having 1 to 10 carbon atoms, and
(i) $R^3$, $R^4$, $R^6$, and $R^7$, independently of one another, are each hydrogen or a monovalent aliphatic, aromatic, or araliphatic organic radical having 1 to 20 carbon atoms,
(ii) $R^3$ and $R^6$, independently of one another, are each a divalent aliphatic, aromatic, or araliphatic organic radical having 1 to 20 carbon atoms, $R^4$ and $R^7$ are a covalent bond, and $R^3$ and $R^6$ are linked via these covalent bonds to the carbon atoms in alpha-position to the oxygen atom of the formula (I), or
(iii) the radicals $R^3$ and $R^4$ meet the definition under (i) and the radicals $R^6$ and $R^7$ meet the definition under (ii);
wherein the coating composition is curable by condensation and/or addition reactions between component (A) and component (B) that are catalyzed by the at least one complex of the formula (I); and
the at least one crosslinking agent comprises free or blocked polyisocyanates or aminoplast resins.

2. The coating composition as claimed in claim 1, wherein component (A) comprises (meth)acrylate (co)polymers, polyesters, alkyds, polyurethanes, polylactones, polycarbonates, polyethers, epoxy resins, epoxy resin-amine adducts, polyureas, polyamides, polyimides, polyester-polyurethanes, polyether-polyurethanes, and/or polyester-polyether-polyurethanes.

3. The coating composition as claimed in claim 1, wherein component (A) comprises hydroxyl and/or carboxyl groups.

4. The coating composition as claimed in claim 1, wherein component (A) comprises at least one hydroxyl-group-containing polymer, and component (B) comprises at least one blocked isocyanate.

5. The coating composition as claimed in claim 1, wherein all radicals $R^1$ to $R^7$ consist of hydrogen and optionally carbon.

6. The coating composition as claimed in claim 1, wherein the radical $R^1$ is an acyclic radical having 2 to 4 carbon atoms.

7. The coating composition as claimed in claim 1, wherein the radicals $R^2$ and $R^5$ are hydrogen or monovalent aliphatic hydrocarbon radicals having 1 to 2 carbon atoms.

8. The coating composition as claimed in claim 1, wherein the variant (ii) applies to the radicals $R^3$, $R^4$, $R^6$, and $R^7$.

9. The coating composition as claimed in claim 8, wherein the radicals $R^3$ and $R^6$ are configured in such a way as to produce a phenyl ring, which may also have further substitution, wherein the C—C double bonds represented in formula (I) are part of the conjugated π system.

10. The coating composition as claimed in claim 1, wherein the catalyst is a complex of doubly deprotonated bis(salicylidene)ethylenediamine with a metal cation.

11. A method for producing a coating by applying a coating composition as claimed in claim 1 to a substrate and subsequently curing thermally.

12. A coating produced by the method as claimed in claim 11.

13. A method of using a complex of the formula (I),

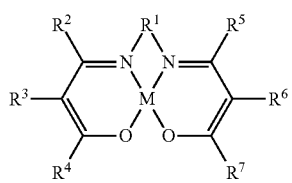

(I)

where
M is a di-, tri-, or tetravalent metal cation comprising V(III), V(IV), Cr(III), Mn(III), Fe(II), Fe(III), Co(II), Co(III), Ni(II), Cu(II), Bi(III) and/or Zn(II),
$R^1$ is a divalent aliphatic, aromatic, or araliphatic hydrocarbon radical having 1 to 10 carbon atoms,
$R^2$ and $R^5$, independently of one another, are each hydrogen or a monovalent aliphatic, aromatic, or araliphatic organic radical having 1 to 10 carbon atoms, and
(i) $R^3$, $R^4$, $R^6$, and $R^7$, independently of one another, are each hydrogen or a monovalent aliphatic, aromatic, or araliphatic organic radical having 1 to 20 carbon atoms,
(ii) $R^3$ and $R^6$, independently of one another, are each a divalent aliphatic, aromatic, or araliphatic organic radical having 1 to 20 carbon atoms, $R^4$ and $R^7$ are a covalent bond, and $R^3$ and $R^6$ are linked via these covalent bonds to the carbon atoms in alpha-position to the oxygen atom of the formula (I), or
(iii) the radicals $R^3$ and $R^4$ meet the definition under (i) and the radicals $R^6$ and $R^7$ meet the definition under (ii),
the method comprising using the complex for catalyzing the curing of coating compositions curable by a condensation and/or addition reaction between A) at least one polymer as binder, and (B) at least one crosslinking agent; wherein the at least one crosslinking agent comprises free or blocked polyisocyanates or aminoplast resins.

14. The coating composition as claimed in claim 7, wherein the radicals $R^2$ and $R^5$ are hydrogen.

* * * * *